United States Patent [19]

Drews

[11] 4,180,290
[45] Dec. 25, 1979

[54] PROPELLED APPARATUS HAVING SURFACE MEANS FOR DEVELOPING INCREASED PROPULSION EFFICIENCIES

[76] Inventor: Hilbert F. P. Drews, 5640 S. 76th St., Greendale, Wis. 53219

[21] Appl. No.: 798,417

[22] Filed: May 16, 1977

Related U.S. Application Data

[63] Continuation-in-part of Ser. No. 631,703, Nov. 13, 1975, abandoned.

[51] Int. Cl.² .......................... B64C 1/38; B62D 35/00
[52] U.S. Cl. .................................. 296/1 S; 180/903; 244/130
[58] Field of Search ............... 296/1 S, 1 R; 244/199, 244/200, 130; 180/1 FV; 49/50, 57; 160/DIG. 7; 61/3, 37

[56] References Cited

U.S. PATENT DOCUMENTS

| | | | |
|---|---|---|---|
| 1,726,882 | 9/1929 | Boerner | 244/130 X |
| 2,261,558 | 11/1941 | Orloff | 244/130 |
| 2,899,150 | 8/1959 | Ellis | 244/130 X |
| 3,128,973 | 4/1964 | Dannenberg | 244/130 |
| 3,523,661 | 8/1970 | Rethorst | 244/199 |
| 3,578,264 | 5/1971 | Kuethe | 244/199 |
| 3,831,885 | 8/1974 | Kasper | 244/199 |
| 3,971,586 | 7/1976 | Saunders | 296/1 S |

FOREIGN PATENT DOCUMENTS 709696 6/1954 United Kingdom .................... 296/1 S

*Primary Examiner*—John P. Silverstrim
*Attorney, Agent, or Firm*—Oblon, Fisher, Spivak, McClelland & Maier

[57] ABSTRACT

An automobile includes a main front air screen generator having a curved wall member extending rearwardly and upwardly to a crest. A central deflector plate develops an air screen in front of the vehicle and a low pressure pocket behind the curved member. The surfaces of the automobile include minute wave-shaped flutes, each including a trough which extends upwardly and rearwardly to a relatively sharp crest and then breaks downwardly and forwardly into the next trough such that any impactive air moves over the surface with engagement only at the crest portions. A screen covers the flutes on the back surfaces and curved vances extending rearwardly and upwardly may optimize the pressure condition.

6 Claims, 11 Drawing Figures

U.S. Patent Dec. 25, 1979 Sheet 1 of 2 4,180,290
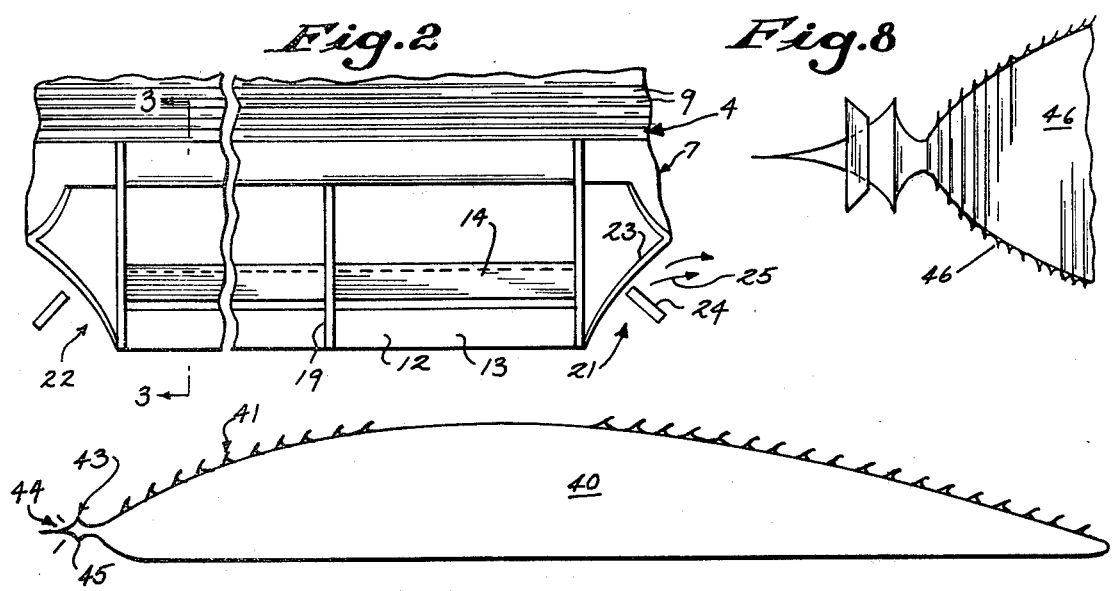
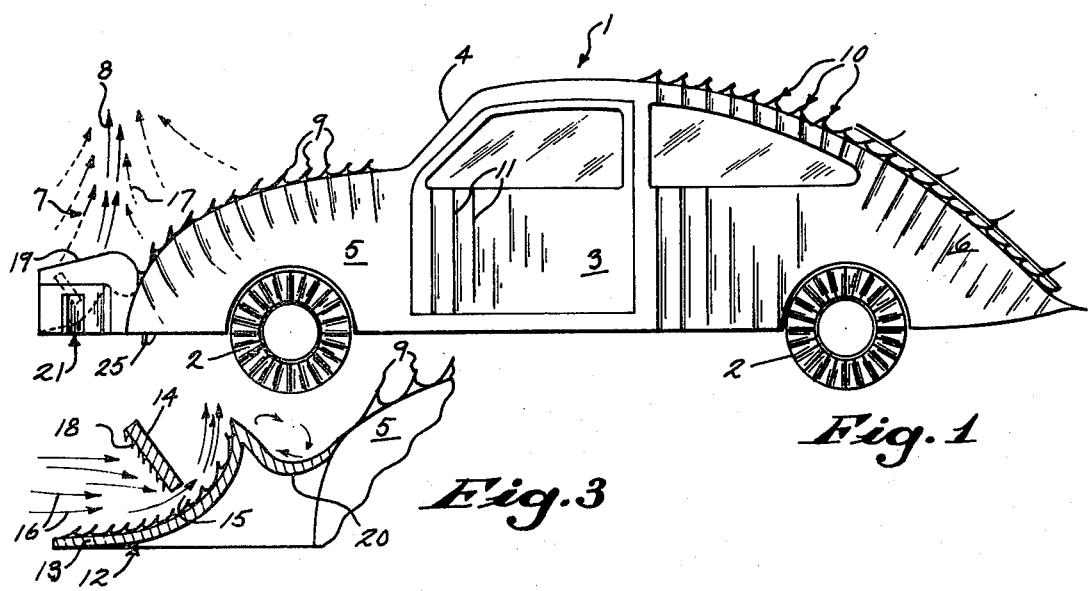
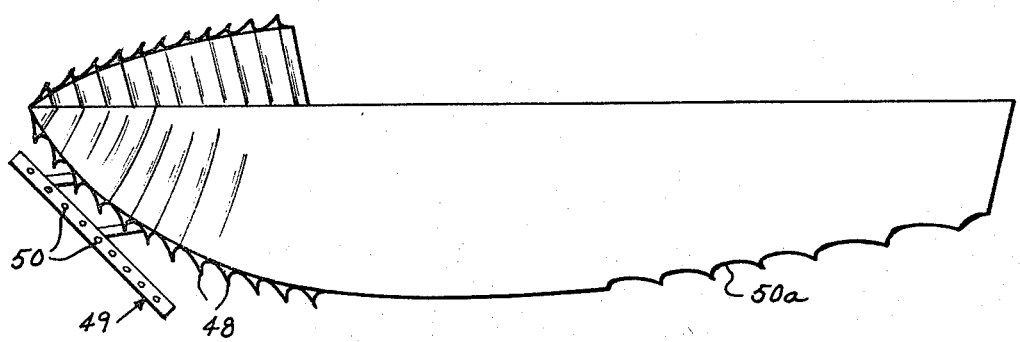

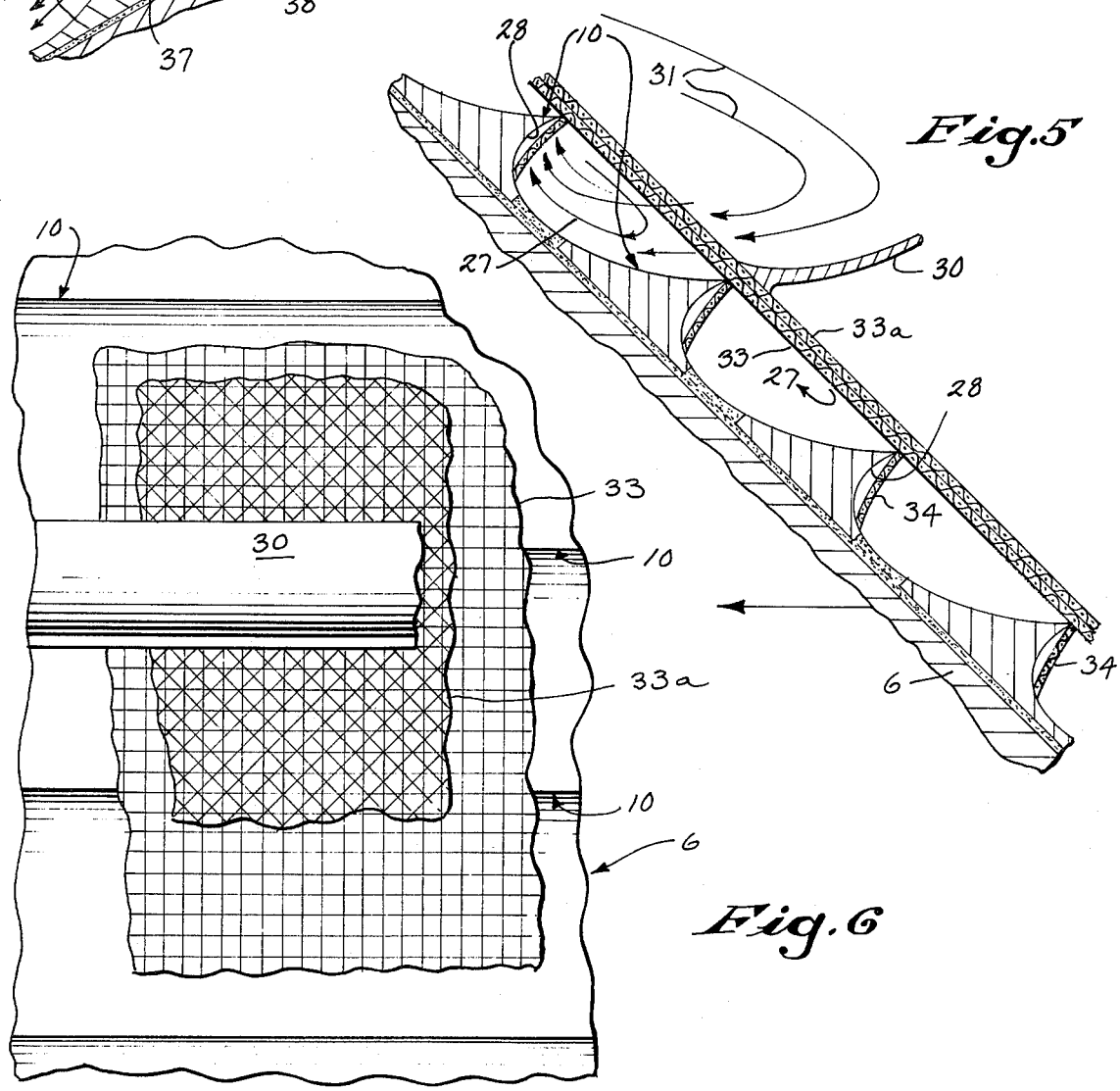

PROPELLED APPARATUS HAVING SURFACE MEANS FOR DEVELOPING INCREASED PROPULSION EFFICIENCIES

CROSS REFERENCE TO RELATED APPLICATION

This patent application is a continuation-in-part application of U.S. Pat. application No. 631,703, filed Nov. 13, 1975, now abandoned.

BACKGROUND OF THE INVENTION

The present invention relates to vehicles having surface means for developing increased propulsion efficiency by reducing of opposing forces acting on the vehicle.

In the development of different crafts for land, air and water transport, significant effort is directed toward the streamlining of the body. Thus, generally it is assumed that the movement of the craft through the air or water requires the movement of the medium over the surface. Streamlined leading surfaces are provided for gradually moving of the air or water laterally aside to minimize the build up of a compacted mass of the fluid. The forward wall does, of course, because of impacting or smashing into the medium, develop a relatively forward compacted mass and opposing pressure, with the streamlined angular orientation of smooth surfaces providing for the mass to slip off the vehicle's surface and rearwardly from the vehicle. This, however, does result in the medium being carried along the surface and thereby creating a drag characteristic. Further, it is well known in the art particularly as applies to land vehicles and the like, the movement of the compacted mass results in the creation of a reduced pressure at rear end of the moving vehicle. This, of course, in essence creates further drag on the vehicle tending to prevent the forward propulsion and further creating a source of inefficiency.

Although streamlined surfaces have been widely developed, and do in fact contribute to improved efficiency, the present inventor has realized that the prior art approach is only directed toward reducing the effect of the impact forces.

In the inventor's copending application entitled "Jet Screen for Vehicles" which was filed Aug. 30, 1974 with Ser. No. 502,048, a unique concept is disclosed which is based on the unique teaching of developing of an air screen in front of the vehicle to essentially eliminate impact conditions over the forward wall surfaces and thereby significantly increasing the efficiency of the vehicle operation. As more fully disclosed in such application, a powered blower or pump means is provided for continuously developing a moving air jet screen in front of the forward moving wall and which is directed generally normal to the direction of movement and continuously. The jet screen carries the air or water from directly in front of the front wall of the craft just outwardly of the configuration of the craft and thereby significantly minimizes the degree of the impact reaction. Thus the continuous jet stream in essence develops a continuously opening window of a significantly minimized pressure or fluid condition through which the vehicle moves. The diverted air or water, of course, closes behind the craft. This system does not therefore rely on deflection of the impacting air or water over the surface but rather employs a relatively high velocity jet to eliminate impact conditions. As more fully disclosed in such application, the preferred embodiments include various powered blower or pump means for developing of the jet screen in front of various crafts such as land vehicles, aircraft and watercraft. Although the teaching of that invention provides significant increased efficiency of the various crafts, the specific embodiments require special power supplies such as air and water pumps and the like with special directing mechanism. Furthermore, as it is not possible to completely generate and remove all of the medium from in front of the impacting surfaces, as a practical matter, some impacting phenomena occur with the consequent disadvantages associated with the conventional designs.

Applicant analysis has further indicated various means can be developed to employ the relative air movement created by the vehicle to generate desirable airflow with respect to the vehicle surfaces and particularly that various wave-shaped surface configurations can be applied to the vehicle to generate a jet screen and further minimize the conventional retarding forces on the craft.

SUMMARY OF THE PRESENT INVENTION

The present invention is thus particularly directed to a concept of employing curved surfaces generally of a wave-shaped configuration with the crest and trough arranged for developing minimum pressure conditions into which the craft moves and/or developing maximum trailing pressure conditions so as to avoid the drag characteristics generally inherent in the craft's movement. In accordance with this aspect of the invention, a curved forward member includes a means to cause the air to move into the curved surface and develop an air screen moving at right angles to the movement of the craft and generally parallel to the projected front surface of the craft. In accordance with another aspect of the present invention, the exterior surface of the craft is provided with a series of minute wave-shaped flutes which create movement of the air over the surface to minimize friction and drag forces.

Generally, in accordance with a preferred construction of the present invention as applied to a land vehicle such as an automobile, a major air screen generator is formed forwardly of the vehicle, such as disclosed in the previously identified copending application, and preferably in accordance with a specially constructed curved self-generating jet generator unit mounted to the forward portion of the vehicle. The front surface of the craft is furthermore formed with a minute wave-shaped or fluted exterior surface defining minor air screen generator for directing of any remaining air generally perpendicular to the direction of movement with respect to the forward surfaces. The rear surface of the craft is also formed with fluted or wave-shaped exterior surfaces which cooperates with the air movement over the craft, tending to trap the air and cause it to move into the rear area of the vehicle. The fluted surface to the rear of the vehicle is further provided with means to accumulate and maximize the air pressure condition to the rear of the craft and thereby enhance the forward propulsion of the vehicle. The main air screen generator is preferably constructed with a curved wall member secured to the front of the vehicle and including a horizontal portion which extends rearwardly and upwardly to a crest which directs the air upwardly into a plane which is at ninety degrees to the direction of movement and thus parallel to projected front wall of the vehicle.

A central located deflector plate defines an air jet accelerating opening or orifice at an intermediate location of the curved member to accelerate the air and develop a high-velocity air screen. The generator is preferably constructed with similar side air screen generator which develop lateral extending air screen jets. In addition, the crest of the curved member breaks or extends over into a continuous surface to the vehicle to develop a recess or pocket immediate behind the curved member. The air screen develops a relatively low pressure condition and low density air mass immediately in front of the adjacent front wall portion of the vehicle.

The front surface minor air screen generator means includes a series of immediately adjacent of closely spaced flutes, each of which is generally wave-shaped and includes a trough which extends upwardly and rearwardly to a relatively sharp crest and then breaks downwardly and forwardly into the next trough. The troughs may be progressively longer on the rearward portions of the front surface. The small flutes tend to direct the air upwardly in generally the same manner as the main air generator. However, being relatively small the air tends to move upwardly over the surface with vortex or swirling air pockets within the troughs such that the impacting air moves over the surface with engagement only at the crest portions and thus with a reduced friction or drag.

The rearward fluted surface includes flutes of the same general cross-section and which may be progressively longer on the rearwardmost portion of the rearward surface. The rearward flutes, however, have each trough extending downwardly and then outwardly to a crest which breaks over, upwardly and inwardly into the adjacent trough to form a pocket with an upper base portion forming an air pressure entrapment means. The air flow past the vehicle tends to develop a low pressure area to the rear of the vehicle. One or more curved vanes are secured to the fluted surface extending rearwardly and upwardly into the generally low pressure area. The result is to direct the adjacent air into the fluted portion to develop a greater pressure by capturing of the air and thereby minimize the retarding force. The pressure conditions may be optimized by covering of the fluted surface with an apertured cover such as a suitable screening to further entrap the pressurized air.

The sides of the vehicle may include flutes similar to the rear wall to react with sidewinds and in particular to minimize the friction of relatively rearward directed sidewinds and capture the force of relatively forwardly directed sidewinds.

In an embodiment for an aircraft, the wing structure may be provided with the main air screen generator and preferably is constructed with an upper and lower generator to develop air screens for the upper and lower surfaces. The air screen need only move the air sufficiently to allow the wing section to pass therethrough. The front surface may advantageously also include the fluted surface, appropriately constructed to minimize friction forces and the like. The rear top surface may also be formed with air flow modifying flutes.

The fluted rear surface of both the land and aircraft may be provided with an outer mesh screen means to enhance air entrapment. The screen means may also be advantageously located within the curved base portion of each flute immediately beneath the crest portion and thus in the area on which the pressure acts to assist in the forward propulsion of the craft. Such screening means could also be applied directly to other rearward surfaces such as the lower frame and related structure located beneath the chassis or body and subject to exterior airflow.

As applied to a watercraft, the main jet screen generator is preferably an externally powered pump means in combination with the minor air screen generating fluted front surface. The fluted surface essentially acts with the water medium which is not completely entrained and removed to minimize the frictional drag forces on the craft.

In summary, the present invention provides a forward pre-vacuation means for prevacuating of the spaces immediately ahead of all and/or portions of the forward or front surface of the craft and a rearward devacuation means for increasing of the pressures in the space immediately behind all and/or portions of the rear surfaces of the craft. The front and rear means contribute to a significant reduction in the volume and size of the wake created by the craft moving through the medium and conseqently results in a significant reduction in the lost energy. In any given craft, the location as well as the wavelength of the flutes and the depth of the trough may vary for developing of optimum prevacuation and/or devacuation conditions as well as optimum frictional drag characteristic.

BRIEF DESCRIPTION OF DRAWINGS

The drawings furnished herewith illustrate a preferred construction of the present invention in which the above advantages and features are clearly disclosed as well as others which will be clear from the following description of such embodiments.

In the drawings:

FIG. 1 is a side elevational view of an automobile incorporating the present invention;

FIG. 2 is a fragmentary plan view of the forward portion of the vehicle;

FIG. 3 is an enlarged vertical section taken generally on line 3—3 of FIG. 2;

FIG. 4 is an enlarged fragmentary vertical section through a portion of the front hood of the automobile;

FIG. 5 is a view similar to FIG. 4 of the rear trunk portion of the vehicle;

FIG. 6 is an enlarged fragmentary view taken generally on line 6—6 of FIG. 5;

FIG. 7 is a sectional view through an aircraft wing and illustrating the present invention;

FIG. 8 is a diagrammatic view illustrating the present invention applied to the front fusilage of an aircraft;

FIG. 9 is a diagrammatic view illustrating the present invention applied to the front hull of a watercraft;

FIG. 10 is a side fragmentary view of a box-like trailer having the rear or back wall incorporating a structure constructed in accordance with the teachings of the present invention; and FIG. 11 is a back view of FIG. 10.

DESCRIPTION OF THE ILLUSTRATED EMBODIMENTS

Referring to the drawings and particularly to FIG. 1, a conventional automobile is diagrammatically illustrated including a body portion 1 mounted on conventional wheels 2. The illustrated body portion 1 includes a central passenger compartment 3 with a front windshield 4 and forwardly extended streamlined hood portion 5 within which the engine (not shown) is housed. The rear or trunk portion 6 of the automobile extends rearwardly from the passenger compartment and is shown of the hatch-back type configuration. In the illustrated embodiment of the invention, a unique main air jet screen generator 7 is mounted to the forward end of the automobile and is adapted to establish an upwardly directed air jet screen 8 moving upwardly in front of the principal portion of the vehicle. The jet screen 8 entrains the adjacent air as at 9 and thus minimizes the air density and pressure adjacent the forward hood portion 5 and windshield 4. The jet screen 8 thus forms a continuously opening window through which the vehicle can move as more fully discussed in the copending application. Recognizing that a complete removal of air be developed and that a certain volume of air and at least a partial air pressure exists in front of the vehicle, the front hood portion 5 and the trailer trunk portion 6 are shown with unique constructed generally fluted surfaces which are specially formed with individual flutes 9 and 10 to minimize the effective area of impact with such remaining air front and to minimize the retarding forces associated with the air moving over the top and side surfaces of the vehicle. In addition, in accordance with the illustrated embodiment of the present invention, the sides of the automobile 1 may be similarly formed of a fluted surface including flutes 11 to enhance the effects of the environmental air conditions. The rear or trunk portion 6 is particularly uniquely constructed to maximize the fluid air pressure conditions and to avoid the drag creating reduced pressure conditions normally encountered.

As more fully developed hereinafter, the present invention includes a self-powered primary air screen generator 7 to develop the air jet screen 8 which is functionally similar to that developed in applicant's previously identified copending application. In addition, applicant has realized that the conventional approach employing a relatively smooth, streamlined body surface, although providing improved efficiencies, does not maximize the effective conditions and in fact that rather than a smooth surface, a surface with the series of generally wave-shaped flutes 9, 10 and 11, shown exaggerated in FIG. 1 of the drawings, in fact minimize the retarding forces. In FIG. 1 the flutes are shown very substantially enlarged for purposes of illustration. In fact the surface consists of relatively minute surface flutes operating to minimize resistance to the forward movement and maximize the pressure conditions to the rear of the vehicle thereby maintaining optimum propulsion conditions.

Although either of the concepts may be separately employed within the broadest aspects and teaching of the present invention, the combination of the front air screen generator 7 and the fluted shaping of the surfaces provide an optimum construction.

The air jet screen generator 7 in the illustrated embodiment of the invention includes a curved channel member 12 secured to the forward end of the automobile and generally in the location of a conventional bumper. The channel 12 may be mounted on the vehicle frame or chassis in any desired manner. The member 12 generally defines a generally curved surface having a forward horizontal end 13 and extending rearwardly. The surface curves upwardly to a generally right angle discharge portion which directs the air upwardly in front of the vehicle and generally at right angles to the vehicle movement to generate the air jet screen 8. An air directing plate 14 extends across the channel member 12 generally centrally thereof and extending angularly outwardly of the curved surface. The inner edge of plate 14 is spaced slightly from the curved member to define a relatively narrow passageway 15 between the inner end of the plate and the central portion of the curved member. As the automobile moves forwardly, the air 16 moving into and between the forward wall of the inclined plate 14 and the member 12 is directed into the restricted area, resulting in a relatively high velocity flow being generated into the curved portion which moves upwardly through the opposite side of the member to define the relatively high velocity jet stream 8. The jet stream, in accordance with well known phenomena will, through aspiration and the like, entrain the adjacent air 17 which moves upwardly with respect to the vehicle and particularly the forward hood portion 5 and the windshield 4 of the vehicle. The entrainment reduces the air density and pressure between the jet screen 8 and the vehicle, thereby minimizing the impact and air compression forces as the vehicle moves forwardly.

The plate 14 therefore assists in accelerating the air flow to a velocity sufficient to establish the desired upwardly directing jets which can function in the same manner as a positively driven blower or the like to entrain the air from in front of the vehicle. Applicant has found the forces created upon the channel member 12 and plate 14 to generate a suitable jet screen does not create any excessive structural forces on the member 12 or plate 14 requiring other than conventional structural support generally encountered in a vehicle bumper construction.

The surfaces of the member 12 and the plate 14 are preferably provided with small flutes 18 which further optimize the air movement, as more fully developed hereinafter in connection with the corresponding description of the fluted surfaces of the automobile.

In the illustrated embodiment of the invention, the main air jet screen generator 7 includes a plurality of parallel, vertical separator plates 19 which are distributed equally across the front of the member 12. The separator plates 19 project upwardly slightly above the uppermost end of the member 12 and the blade 14 and minimize the effect of the cross winds on the vehicle.

The member 12 further is constructed with a trailing wave-shaped trough member 20 which merges smoothly into the fluted surface lowermost end of the hood portion 5. This results in blockage of the air passage from around and beneath the general area the between the jet screen generator 7 and the vehicle and develops an area in which a low pressure condition is developed. The air fluid in the area will tend to be continuously entrained carried with the jet stream 8. The remaining air within the area may form a vortex-type motion with a relatively low pressure condition immediately adjacent the forward wall of the vehicle in contrast to the usual high impact pressures resulting from the vehicle movement.

In addition, further additional cross wind control can be obtained by terminating of the jet generator member 12 inwardly of the maximum width of the vehicle and providing side jet screen generators 21 and 22 directing of the air laterally of the vehicle in essentially the same manner as the previously described air jet screen generator 8. Thus each of the side generators 21 and 22 is similarly constructed and unit 21 is described.

Generally generator 21 includes a curved member 23 which extends from the front edge of the member 12 and curves rearwardly and laterally to the side of the vehicle. An air directing plate 24 is secured within the curved member, extending generally normal thereto and defining a generally V-shaped opening to a restricted portion, thus generating a sidewise air jet screen 25.

The main air stream generator 7 including the auxiliary side jet units functions in essentially the same manner as the powered blower system shown as preferred embodiments in applicant's previously identified copending application. If the air jet streams 8 do not completely cover the desired forward area of the vehicle because of the size or the like, a plurality of generators can of course be employed and located adjacent to the required areas. For example, an auxiliary air stream generator, not shown, similar to that illustrated for the main air stream generator 7 may be located immediately in front of the windshield 4 of the vehicle. Thus the illustrated air stream generator 8 would primarily provide an air screen for the lower portion of the vehicle and the secondary air screen generator, not shown, would provide a similar air screen for the upper portion of the vehicle.

In the illustrated embodiment of the invention, the fluted surface of the hood portion in effect functions as a series of small or minor air screen generators to minimize the frictional drag of the remaining air mass which moves over the hood portion of the vehicle and to optimize the air flow mass over the vehicles's surface for optimum propulsion efficiencies.

Referring particularly to FIG. 4, an enlarged fragmentary view of a portion of the hood portion 5 of FIG. 1 is illustrated. As shown therein, the fluted surface defines a series of wave-shaped flutes 9, which extend in immediately adjacent parallel relation. Each of the flutes is a constant cross-section along its length and includes a depression or trough 22 which progressively moves upwardly and rearwardly to a crest 23, merging with the next parallel trough 22. The flutes can be very minute. For example there may be approximately 16 flutes to an inch and have a depth of 11/32 to 1/16 of an inch. The inventor for example has used a shade screen material having 16 crests to an inch and manufactured by Kaiser Aluminum. Wind test with such material has shown a lesser flow resistance and clearly indicated the advantage of the present invention. The flutes 9 extend upwardly along the curved surface of the hood portion 4 with the peaks or crest 23 of each flute 9 correspondingly positioned rearwardly and upwardly from the previous crest 23. Further, the length of the flutes 9 and particularly the troughs 22 increase progressively toward the rear of the hood portion. As a result of the configuration, the movement of the incoming air mass 24, resulting from the relative movement of the vehicle tends to move into the trough 22 of each flute 9 engaging the rising portion to the crest of the flute 9 and moving upwardly over the crest. The air mass 24 is directed upwardly by the crest and moves rearwardly over the adjacent trough 22 to define an air flow 25 over the surface of the hood portion 4 which engages the crests only. The movement of the air mass 24 appears to generate small vortex motions within the wave troughs 22 which further act to reduce the atmospheric and/or air pressure within the trough of each flute. The flute 9 also successively directs the air upwardly and thus acts as minute screen generators which minimize the build-up of forward impact pressures. The flutes then establish a minimal resistance to the movement of the vehicle.

The surface configuration in fact may advantageously not be a smooth surface such as taught by the prior art, but is rather formed with a special air directing configuration to enhance the air flow adjacent to the vehicle to minimize the drag on the vehicle.

Applicant has also constructed a main air jet generator 7 with a fluted surface as illustrated in FIG. 1 and without a fluted surface and has found that the fluted surface results in an increase in the efficiency of the operation.

Generally, air for the motor cooling and combustion may be provided in any suitable manner. In FIG. 1, an air scoop 25a is shown to the bottom of the vehicle just forwardly of the radiator, not shown.

As previously noted the aft or trunk portion of the automobile is preferably further uniquely constructed to minimize the reduction in pressure on the rearward surface of the vehicle as normally encountered in conventional construction, particularly at high speed. In particular, the inventor has found that by a rearward directed flute surface developed by a plurality of adjacent and successive flutes 26 having a wave-shaped configuration on the trailing portion of the vehicle is also advantageously employed. An opposite effect appears to be created wherein the atmospheric pressure conditions on the rearward surfaces of the vehicle can be increased or maximized so as to significantly eliminate the normal drag created by movement of the vehicle through the air. The fluted surface thus generates maximum sustained atmospheric or fluid pressure on the rear surface of the vehicle and thereby further enhances the overall propulsion efficiency. It is believed that the interaction to the rear portion of the vehicle is a result of the air tending to move over the surface, and in moving over the surface, generating small vortex motions 27 which are trapped by the cupped base portion 28 of the flute 10 and thus creating a pressure enhancement action. Thus the reverse or downward direction of the fluted surface develops the rearwardly directed cupped portions which opened downwardly as a result of the reverse cresting. Thus in any instance where the actual air flow is such as to move from the rear to the forward part of the automobile, such air will in fact be trapped and develop an increase pressure condition on the rearward surfaces of the vehicle tending to positively push it forward and thereby to further enhance the efficiency of propulsion. The fluted surface is apparently well suited to take advantage of the turbulence present at the back of the vehicle to maximize pressure conditions on the rearward surfaces and the vehicle.

Generally, the action is further enhanced by a plurality of laterally extending upwardly curving vanes 30 which extend across the backside of the trunk portion 6 and over the fluted surface. The vanes 30 are preferably located below the upper level of the automobile and thus within the normal evacuated trailing atmosphere. The vanes 30 are further relatively widely spaced and curved upwardly and rearwardly from the fluted surface. As the air 31 moves into the vanes 30, the air is directed into the flutes and in fact into the reversed crested or cupped portion 28 of the wave-shaped flutes. The vanes 30 thus tend to increase the vortex type motion and capturing of the air to the rear side of the vehicle.

This may be further enhanced by employing an apertured overlay of the fluted trunk portion, as most clearly shown in FIG. 4. Applicant has found that a conventional wire screening can be advantageously be employed. In the illustrated embodiment of the invention, two layers of screening 33 and 33a secured overlying the crests of the fluted surfaces. The screening is formed of a plurality of intersecting and woven wire or thread-like elements having 90 degree intersections. The screens 33 and 33a are preferably secured to each other and to the vehicle, with the elements offset by approximately 45 degrees to define triangularly shaped openings. The screening 33 and 33a permits the forced air flow into the flute members but tends to trap the air so as to build up the pressure conditions therein and assist in maximizing of the pressure conditions behind the vehicle.

The apertured cover 33–33a and the laterally extending vanes or louvers 30 function to enhance the flow across the surface by utilizing and enhancing the natural turbulence of the atmospheric condition in behind the vehicle.

In fact, screening may also advantageously be located within the cup-shaped portion as shown at 34 in FIG. 5 to further enhance the maximizing of the pressure condition on the rearward surface of the vehicle. The pressure enhancement may also be provided by direct embossment of the cup-shaped surface with generally reversed shaped waves or the like.

As previously noted, the side of the vehicle is preferably also provided with the minute flutes 35 similar to those on the hood portion 5 and which interact with any cross-winds. If the cross-wind generally flows from the front to the rear of the vehicle, the air engages the fluted surfaces with the same type of action as over the hood portion 5 and moves across the surface with relatively low frictional contact as a result of the rearward direction of the crested waves. If a cross-wind is extending from the rear to the front of the vehicle, the air moves into the fluted surfaces to effect a forward pressurization of the vehicle movement similar to action of the fluted portion on the trunk portion 6.

The side-fluted configuration thus primarily provides a minimum resistance characteristic while also providing for appropriate shaping in connection, or increased efficiency with appropriate cross-winds.

The wheel structures and particularly the tires may be formed with fluted surfaces. The tires, which may be rotated, may be conveniently formed with symmetrical wave-shaped troughs so each tire can be mounted on any axle.

Generally, in accordance with the optimum construction as illustrated in FIG. 1 the present invention provides a means to develop a minimum impact condition to the front of the vehicle while minimizing of the frictional drag and the post-evacuation drag normally associated with a vehicle.

Although the fluted surface can of course be formed in any desired manner, it may advantageously be applied as a separate foil-like cover member secured to the vehicle by an adhesive 36 such as shown in the enlarged views of FIGS. 5 and 6. Thus, in the illustrated embodiment of the invention, the foil-like cover member includes a continuous foil-like base sheet 37 having a plurality of apertures 38. The base sheet 37 may be adhesively secured to the surface and the exterior surface is painted as at 39. The outer paint coating 39 which extends through apertures 38 is additionally interlocking of the member to the surface and in fact may be employed as the sole attachment means. The flutes are integrally formed with the vase shut and may be molded or otherwise formed. The fluted surface element with the minute and adjacent flutes also provide an aesthetically pleasing surface. Further forming thereof of a suitable molded plastic or the like also minimize the build up of dirt and foreign matter and makes the surface readily cleaned with conventional cleaning processes.

Although preferably formed as a preformed fluted surface, the crest portions may be generally thin, flat elements which are deflected by the air to form the fluted crest portions. Although shown as only including the unique flow configuration, the various concepts can be of course be further implemented with supplementing air sources such as the blower or pump means disclosed in applicant's previously defined, previous copending application. For example, the forward air screen generator 8 may incorporate a suitable air blower to generate an auxiliary jet means which is added to that generated by the member 12 to further enhance the upwardly or the air screen for a more effective prevacuation and minimizing of the air mass and pressure in front of the vehicle. Similarly, the aft end of the system can be further enhanced by providing blowers and/or air pumps which develop an air flow over the surface to further enhance the trapping of the air flutes on the trunk portion 6 to thereby essentially eliminate the drag effect normally associated with the propulsion of a vehicle through a fluid medium.

Although the reverse or downwardly directed wave-shaped flutes on the backside of the automobile are preferred, the ripple-like surfaces or shapes may be employed. For example, a plurality of semicircular ridges connected by generally V-shaped recesses will also improve the pressure condition on the backside of the vehicle. Thus, the illustrated wave-shaped ripples provide an optimum construction but other shapes may be used.

The present invention may, of course, be applied to other vehicles such as aircraft and watercraft. For example, in FIG. 5, a wing section 40 is illustrated wherein the forward and aft upper surfaces are provided with the special fluted surfaces 41 and 42. In the illustrated embodiment of the invention, a forward main air screen generator 43 is also illustrated. The generator 43 is generally constructed with an upper and lower jet generating sections 44 and 45, each of which is preferably constructed as that shown in FIG. 1 for generating of the vertically directed air jet screen 8. Generally, it is believed that the air screen generator is advantageously employed to minimize a forward air pressure and thus minimize the impact conditions created by the high speed movement of the wing through the air.

In the case of a wing structure, the forward fluted surface 41 would of course minimize the drag and improve the air flow over the surface, generally also in accordance with the theory described in connection with the vehicle.

The trailing fluted portion 42 will take greatest advantage of turbulence and capture greatest air pressure directed in a forward direction without interferring with the lift capacity of the wing. It is believed that the miniature air stream generator defined by the surface 43 decreases the forward pressure on the wing and thereby increase the lift characteristic and further may significantly decrease the drag. If an overlying aperture cover is applied to the aft portion, the air pressure trapped above the wing would increase the forward propulsion forces. However, the capturing of the air would decrease the pressure differential and thereby the lift force on the aircraft. As applied to an aircraft wing, therefore, a balanced condition should be designed to produce optimum conditions based on reduction in the drag and increased lift characteristics.

As applied to an aircraft fuselage, which has generally been constructed as a smooth cylindrical member, the present invention would provide a series of annular convolutions or flutes 46 on all wall surfaces such as diagrammatically shown in FIG. 6 on the front wall surfaces. Thus, the fluted surfaces 46 would continuously shape and improve the flow characteristic with improved efficiency of propulsion for much the same reasons described with respect to the automobile.

Similarly, a watercraft such as partially shown in FIG. 9 may have its forward hull constructed with the rearwardly directed flutes 48 on the bottom front wall for corresponding interaction with the water medium as the hull rapidly moves through the water. In the case of a watercraft, a powered fluid generator 49 is preferably employed. The generator 49 may be constructed in any desired manner in accordance with the teaching more fully set forth in applicant's copending application. Generally, the generator 49 corresponds to that shown therein and develops laterally and downwardly directed water jets 50 which tend to evacuate the water from immediately in front of the watercraft thereby reducing the build-up of impact forces on the fluid in front of the hull. The rear bottom wall of the craft may be formed as a fluted surface, as at 50a. The flutes 48 and 50a further minimize the frictional drag characteristics.

The upper or top portion of the watercraft, if provided with a cabin or the like, may be provided with a fluted surface to minimize the air resistance for the reasons described in connection with automobiles.

Further, in connection with a vehicle such as a semi-trailer truck body which defines a rear rectangular box, the air flow can be enhanced by the use of a rear fluted configuration such as shown in FIG. 10. In the case of such a large rear rectangular construction, a back screen cover 51 is secured to the rear surface for capturing of the air. Vertical and horizontal louvers or vanes 52 and 53 are shown to direct the air into the screened covered portion. The louvers will tend to generate a turbulent condition immediately adjacent to aft surfaces of the vehicle with the maximizing of pressure conditions immediately to the aft end.

The invention is particularly directed to an improved apparatus for air flow control or jet generation employing curved surfaces and members. The major jet screen generator provides a relatively inexpensive and long life system for eliminating the impacting and air compression forces while the wave-shaped surfaces enhance the drag and pressure characteristic of the propelled crafts.

Various modes of carrying out the invention are contemplated as being within the scope of the following claims particularly pointing out and distinctly claiming the subject matter which is regarded as the invention.

I claim:

1. In a craft adapted to be moved through a fluid and having a forward wall portion moving through and parting the fluid as the craft moves through the fluid and having a trailing portion, said forward wall portion of the craft defining a fluid impacting surface, said surface including a substantial plurality of adjacent and parallel waveshaped elongated flutes, each of said flutes extending as an elongated flute with a constant cross-section along said forward wall portion, each of said flutes having an essentially similar cross-section to that of the other flutes and having a trough portion extending upwardly and rearwardly to a crest portion developing an outwardly directed air stream, the crest portion of each flute overlying the trough portion of the flute rearwardly adjacent thereto to define a fluid pocket beneath the crest portion, said flutes being connected by a thin mounting base member, said flutes and base member being formed as an integral molded plastic element, and an adhesive attachment means securing said plastic element to said forward wall portion.

2. In the craft of claim 1 wherein said base member includes a plurality of openings filled by a coating to further lock the member to the wall portion.

3. In the craft of claim 1 wherein the adjacent crests of said flutes are spaced from each other by a distance on the order of one-sixteenth of an inch and having a trough depth no greater than the spacing of the crests.

4. In the craft of claim 3 wherein the trough depth is on the order of one-thirty secondth of an inch.

5. A vehicle adapted to be moved through air and having a rear trailing wall portion extending rearwardly and downwardly, comprising a plurality of rearwardly and upwardly opening wave-shaped flutes formed on said trailing wall portion for developing atmospheric pressure adjacent said trailing wall portion, and an apertured cover means secured to the flutes and operable to trap air pressure within the flutes.

6. In a vehicle adapted to be moved through air and having a rear trailing wall portion extending rearwardly and downwardly, said trailing wall portion including a plurality of rearwardly and upwardly opening wave-shaped flutes for developing atmospheric pressure adjacent said trailing wall portion, an enhancement screen secured within the forward portion of the flutes and in slightly spaced relation to said forward portion to enhance pressurization on such portion.

* * * * *